T. W. IRWIN & G. K. REBER,

Assignors to THE SOLDERLESS STANDING SEAM CONDUCTOR COMPANY—Limited.

Water-Conductor.

No. 9,070. Reissued Feb. 10, 1880.

Witnesses.
Jno. K. Smith
L. C. Fitler.

Inventors
Thomas W. Irwin
George K. Reber
by their Attorneys
Baldwell & Kerr

UNITED STATES PATENT OFFICE.

THOMAS W. IRWIN, OF ALLEGHENY, AND GEORGE K. REBER, OF PITTSBURG, ASSIGNORS TO THE SOLDERLESS STANDING SEAM CONDUCTOR COMPANY, (LIMITED,) OF ALLEGHENY, PENNSYLVANIA.

WATER-CONDUCTOR.

SPECIFICATION forming part of Reissued Letters Patent No. 9,070, dated February 10, 1880.

Original No. 216,188, dated June 3, 1879. Application for Reissue filed January 15, 1880.

*To all whom it may concern:*

Be it known that we, THOMAS W. IRWIN, of Allegheny city, and GEORGE K. REBER, of Pittsburg, in the county of Allegheny and State of Pennsylvania, have invented a new and useful Improvement in Water-Conductors; and we do hereby declare the following to be a full, clear, and exact description thereof, reference being had to the accompanying drawings, forming a part of this specification, in which—

Figure 2:
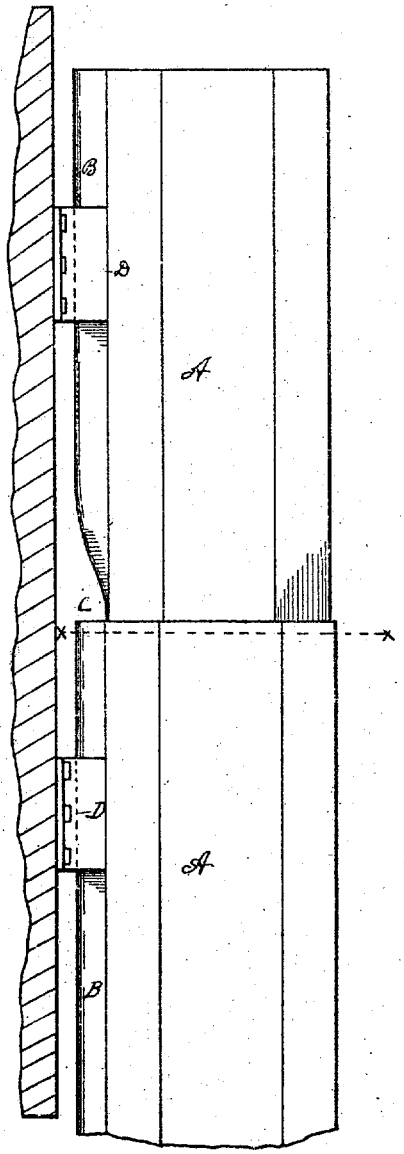
Figure 1:
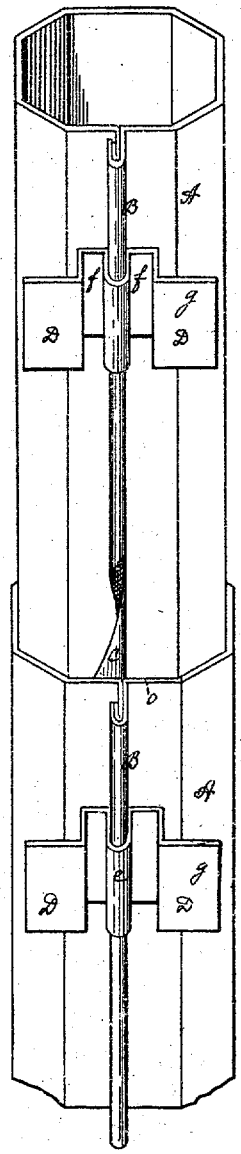
Figure 3:
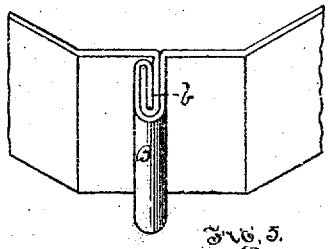
Figure 4:
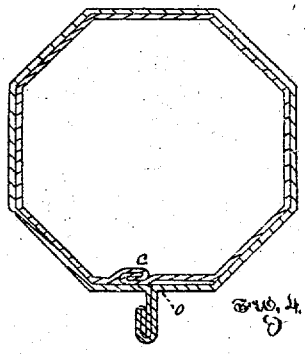
Figure 5:
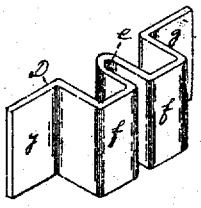

Figure 1 is a perspective view of our improved water-conductor. Fig. 2 is a side view of the same attached to a building. Fig. 3 is an enlarged detached top view. Fig. 4 is a cross-section on the line *x x*, Fig. 2; and Fig. 5 is a face view of the fastener.

Like letters of reference indicate like parts in each.

Our invention relates to water-conductors placed upon the sides of houses, stores, and other buildings for the purpose of carrying the rain-water from the roof to the surface of the ground, or to tanks or other receptacles when it is used for different purposes; and it consists in an improved manner of joining the sections of conductors having a standing seam, and of an improved fastener for securing such conductors to the building, whereby the conductors, when put up, will have a strong substantial support, and will not be liable to part at the joints, or so swung by the wind or other causes as to loosen their connection with the roof and cause leakage.

To enable others skilled in the art to make and use our invention, we will describe its construction and manner of use.

In the drawings referred to, A represents the water-conductor, which is made of sheet-iron or other suitable metal, and may be of any desired shape—either round, angular, or corrugated.

B is the standing seam uniting the two sides of the sheet from which the pipe is made. This seam B is formed so as to stand up from the pipe, preferably at a right angle to a tangent of the pipe, at the point from which the seam extends, and is bent again to form a double lock, *b*.

The seam B may be united in different ways, though the following is the way preferred by us, as it gives the firmest and best joint: By machinery suitable for the purpose a crease is made along one side of the sheet and a bend along both sides, so that when brought together the portions bent out will lie flat together, the edge along one side fitting within the crease on the other side, and the whole extending out from the pipe. Another crease or lock is then made by turning over part of the standing or bent-out portions, so that the first crease will come against the extension or standing seam, thus forming what may be termed a "double-locked standing seam." This seam, as it is double-locked, needs no soldering to make it water-tight, and will stand a heavy strain before a leak will be sprung in it, and thus makes the seam of the pipe as strong as any other portion. The standing seam B may, however, be united by riveting or soldering.

The pipes or conductors are formed in lengths or sections, and the upper section slipped within the lower one to form any length of conductor desired. As the standing seam would not slip within the lower section, it is bent down flat against the pipe at the base of each section, as shown at *c*, so that it will fit within the pipe. The thick seam, when bent against the body of the pipe, as at *c*, and slipped within the next pipe, will bend the pipe slightly out of shape, and so leave an opening, *o*, to conduct any rain or overflow on the surface of the conductor back into the lower pipe.

D represents our improved fastener for securing the pipe to the wall, which is, preferably, made of sheet metal bent to shape, though it may be cast to shape, if desired. Extending along the center of the fastener is the longitudinal groove or recess *e*, for the reception of the standing seam B, and on either side of the groove *e* are the seats *f*, formed to the shape of the conductor, so that when the seam B fits within the groove the seats *f* will fit against the body of the conductor and so brace it as to prevent its swinging.

In the drawings the conductor is octagonal in shape, and the seam extends out from one of the flat surfaces of the pipe, so that the seats *f* are flat to correspond with this surface of the pipe. Where the pipe is round the seats will be made concave to correspond.

Beyond the seats *f* are suitable flat surfaces *g*, to attach the fastener to the wall. The fastener may, however, be attached to the wall by means of hooks and other devices suitable for the purpose. The conductor is secured to the fastener by riveting or soldering to the standing seam or to the body of the conductor through the seats *f*.

The manner of hanging and using our improved conductor is as follows: The fasteners are attached to the different sections forming the conductor at suitable distances, in such position that the standing seam B fits within the groove or recess *e*, and the body of the conductor against the seats *f*. The sections are slipped together, the upper ones fitting into the lower ones, and the flattened seams *c* at the base separating the sections, so as to leave the openings *o* for conducting the overflow back into the lower section. The conductor can be secured at any desired distance from the wall by constructing the fastener so that the groove *e* is held away from the wall. It is held steady and prevented from swinging by means of the seats *f* on either side of the groove, and the leakage or overflow is carried through the opening back into the lower section of the conductor.

What we claim as our invention, and desire to secure by Letters Patent, is—

1. A water-conductor provided with a standing seam bent against the body of the pipe at the base of each section, so as to fit within the lower section, substantially as described.

2. In combination with a water-conductor provided with a standing seam, a fastener in which is formed a longitudinal groove or recess for the reception of the standing seam, substantially as described.

3. In combination with a water-conductor having a standing seam, a fastener provided with a groove for the reception of the standing seam and seats against which the body of the conductor rests, substantially as and for the purposes set forth.

In testimony whereof we, the said THOMAS W. IRWIN and GEORGE K. REBER, have hereunto set our hands.

THOS. W. IRWIN.
GEO. K. REBER.

Witnesses:
JNO. K. SMITH,
T. B. KERR.